United States Patent [19]
Hwang et al.

[11] Patent Number: 5,611,368
[45] Date of Patent: Mar. 18, 1997

[54] VALVE HAVING MAGNETIC FORCE TRANSMISSION APPARATUS

[75] Inventors: Sung-Tai Hwang; Jong-Hyeun Choi; Tae-Joon Kim; Yun-Dong Choi, all of Daejeon-Si; Byung-Real Jo, Seoul, all of Rep. of Korea

[73] Assignee: Korea Atomic Energy Research Institute, Daejeon-Si, Rep. of Korea

[21] Appl. No.: 432,625

[22] Filed: May 2, 1995

[30] Foreign Application Priority Data

May 2, 1994 [KR] Rep. of Korea .......................... 94-9630
Apr. 11, 1995 [KR] Rep. of Korea .......................... 95-8372

[51] Int. Cl.$^6$ ............................ F16K 37/00; F16K 31/11
[52] U.S. Cl. ............................................. 137/553; 251/65
[58] Field of Search ........................... 251/65, 326, 304, 251/305, 315.01; 137/553

[56] References Cited

U.S. PATENT DOCUMENTS

| | | | |
|---|---|---|---|
| 3,889,922 | 6/1975 | Peters | 137/553 X |
| 4,274,444 | 6/1981 | Ruyak | 251/65 X |
| 4,284,262 | 8/1981 | Ruyak | 251/65 |
| 4,384,703 | 5/1983 | Ruyak et al. | 251/65 |

*Primary Examiner*—Kevin Lee
*Attorney, Agent, or Firm*—Nikaido, Marmelstein, Murray & Oram LLP

[57] ABSTRACT

A valve having a magnetic force transmission apparatus is disclosed including: a closed body for tightly closing internal components and rotation shaft of the body of the valve, so as to interrupt the leakage of fluid from the valve and maintain perfect airtightness; and a pair of permanent magnet plates opposingly placed in the closed body and for allowing the valve open/close by transmitting power using the magnetic force of magnet pieces attached on yokes in non-contact.

20 Claims, 6 Drawing Sheets

5,611,368

VALVE HAVING MAGNETIC FORCE TRANSMISSION APPARATUS

BACKGROUND OF THE INVENTION

The present invention relates to a valve having a magnetic force transmission apparatus, which is opened/closed by the transmission of force externally using magnetism in a non-contact manner.

In a variety of conventional valves using a glove, gate, needle or ball, packings are essentially used to prevent fluid from leakage. According to the frequencies of use, fluid is leaked from the stem of valves, though there are differences for kinds of valve.

SUMMARY OF THE INVENTION

Therefore, in order to overcome such problems, it is an object of the present invention to provide a valve having a magnetic force transmission apparatus, in which external leakage from a stem of the valve is not caused, and the valve is opened/closed by driving the stem by non-contact magnetic force.

To accomplish the object of the present invention, there is provided a valve having a magnetic force transmission apparatus comprising: a closed body for tightly closing internal components and rotation shaft of the body of the valve, so as to interrupt the leakage of fluid from the valve and maintain perfect airtightness; and a pair of permanent magnet plates opposingly placed in the closed body and for allowing the valve to open/close by transmitting power using the magnetic force of magnet pieces attached on yokes in a non-contact.

BRIEF DESCRIPTION OF THE ATTACHED DRAWINGS

DETAILED DESCRIPTION OF THE INVENTION

Hereinafter, preferred embodiments of the present invention will be described below with reference to the attached drawings.

Figure 1:
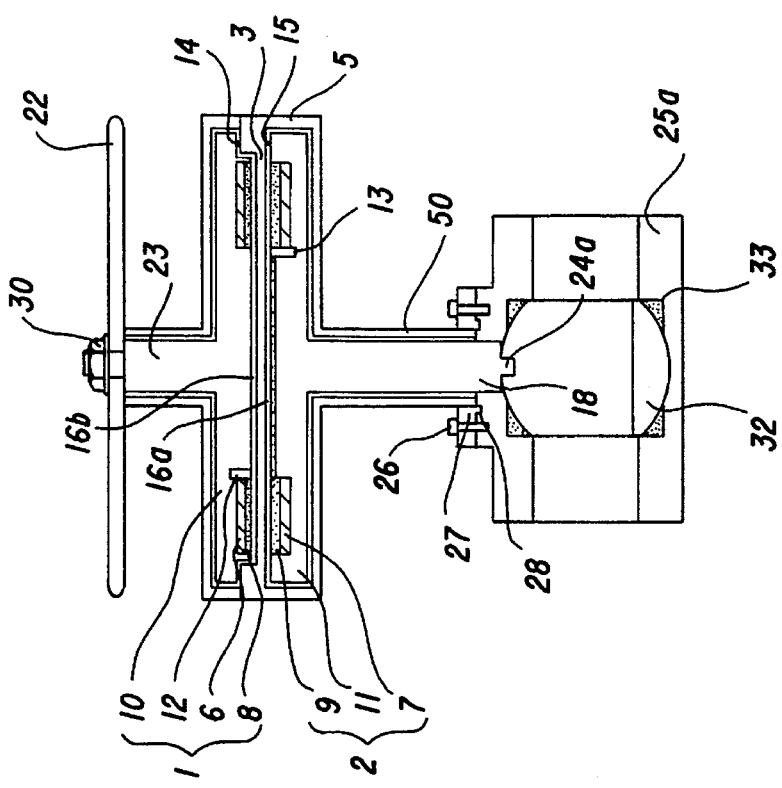
FIG. 1 is a cross-sectional view of one embodiment of the present invention in which a ball valve employs a magnetic force transmission apparatus.

Referring to FIG. 1, the ball for directly interrupting the flow of fluid and located in the lower portion of a ball valve having a magnetic force transmission apparatus of the present invention is the same as a conventional ball. A power transmission apparatus located in the upper portion and for rotating this ball is the feature of the present invention.

The power transmission apparatus is roughly divided into upper permanent magnet plate 1 and lower permanent magnet plate 2, which are incorporated in a closed body 50 serving to maintain airtightness. On these magnet plates are opposing yokes 6 and 7 and permanent magnet pieces 8 and 9, respectively. Permanent magnet pieces 8 and 9 of yokes 6 and 7 are fixedly installed in housings 10 and 11, respectively. Keys 12 and 13 are fixed between yokes 6 and 7 and housings 10 and 11 so that the entire components of the permanent magnet plates can rotate as they turn.

A separation plate 3 is formed between upper and lower permanent magnet plates 1 and 2. Bearings 14 and 15 for reducing friction is installed therebetween. With bearings 14 and 15, cavities 16a and 16b are formed between permanent magnet plates 1 and 2 and separation plate 3, thereby preventing permanent magnet plates 1 and 2 from being worn out due to the friction between the permanent magnet plates and separation plate as the permanent magnet plates rotate.

A stem 18 of the valve is fixedly connected to the lower permanent magnet plate 2. The end of stem 18 is coupled to ball 32 in a shape of rectangular wedge 24a. Ball 32 is fitted into valve body 25a with a seal 33 so as to prevent internal leakage. Closed body 50 with the magnetic force transmission apparatus and valve body 25a are connected to each other by a bolt 26. Here, a bonnet 27 presses seal 28 to thereby prevent fluid from leakage. Their connection may be performed by welding not by the bolt. Therefore, like gate, glove and needle valves to be introduced later, lower permanent magnet plate 2 rotates along with the rotation of upper permanent magnet plate 1. Here, ball 32 engaged with stem 18 rotates to open/close the valve.

As shown in the drawings, manually-operated handle 22 is coupled to a upward protruded rotation shaft 23 of upper permanent magnet plate 1 by a fixing nut 30. As manually-operated handle 22 is rotated externally, upper permanent magnet plate 1 rotates. Here, manually-operated handle 22 may be designed to rotate automatically by attaching an automatic actuator.

Figure 2:
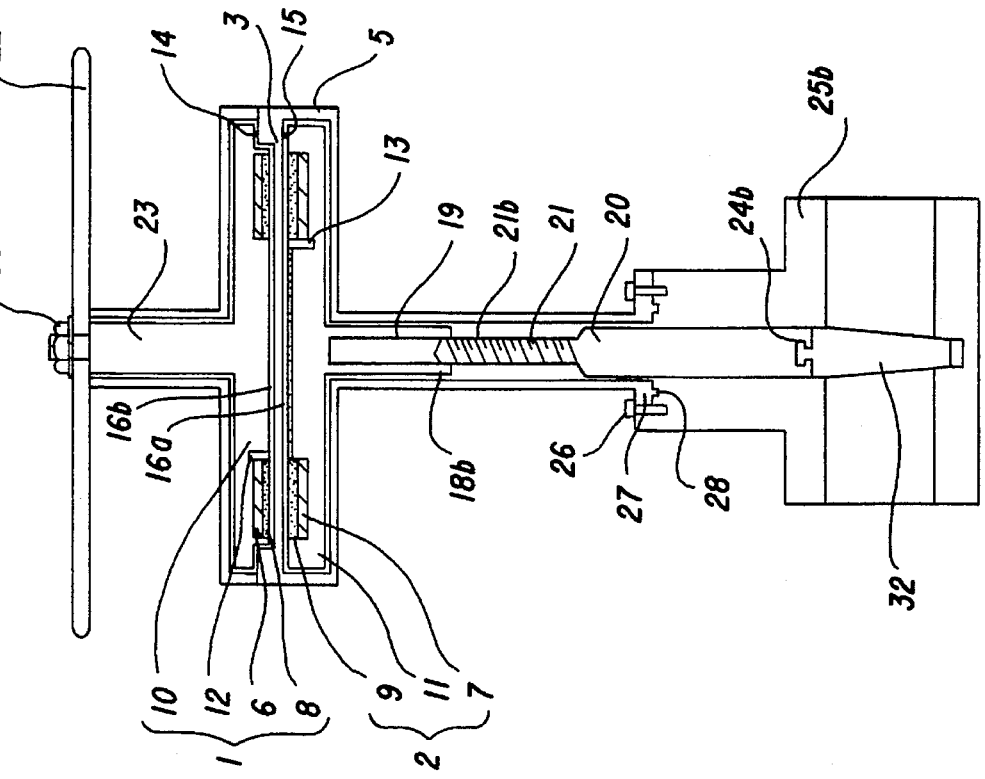
FIG. 2 is a cross-sectional view of another embodiment of the present invention in which a stem moves up and down such as a glove, gate or needle valve.

Referring to FIG. 2, this embodiment employs the magnetic force transmission apparatus of the present invention in a gate valve. This case can be adapted in glove and needle valves in the same configuration. The same numerals are designated to the same components as in FIG. 1. Here, the description of overlapped elements will be omitted.

In a gate, glove or needle valve, a cylindrical female screw 19 is formed on the inner surface of protruded shaft 18b formed under permanent magnet plate 2. The female screw is coupled to a male screw 21b formed on the outer surface of a protruded rod 21 formed protrudently on the top of valve stem 20. As handle 22 rotates, gate 32a moves up and down. When handle 22 is turned to make upper permanent magnet plate 1 rotate, lower permanent magnet plate 2 also rotates by the attraction of the flow of magnetic field.

Accordingly, protruded rod 21 of valve stem 20 moves up or down by the rotation force.

More specifically, upper and lower permanent magnet plates 1 and 2 and protruded shaft 18b serve as nuts as they rotate. Protruded rod 21 of valve stem 20 connected thereto act as bolts as they move up and down. In this situation, gate 32a moves up and down to open/close the flow of fluid. The up/down movement function is held in the conventional valve so that it can be used without any change. If the ball, gate, glove, or needle valve is used for high temperature, the outer portion of stem (reference numeral 18 of FIG. 1 and 18B of FIG. 2) can be elongated and a heat-proof plate may be employed.

Figure 3A:
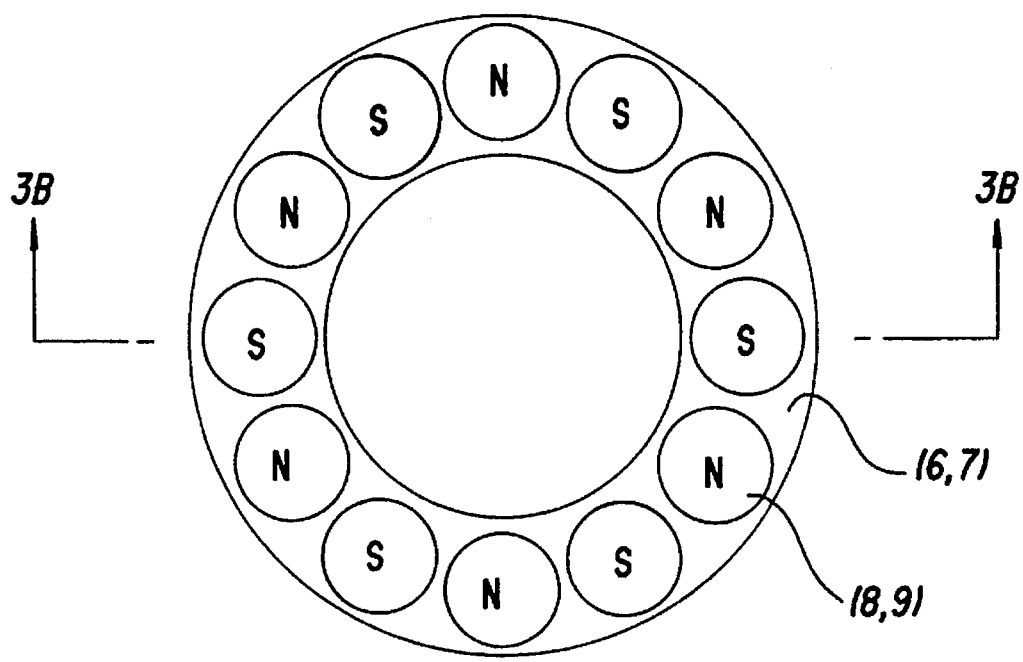
FIG. 3A is a plan view of a state in which permanent magnet pieces are disposed in one ring on a disk.
Figure 3B:
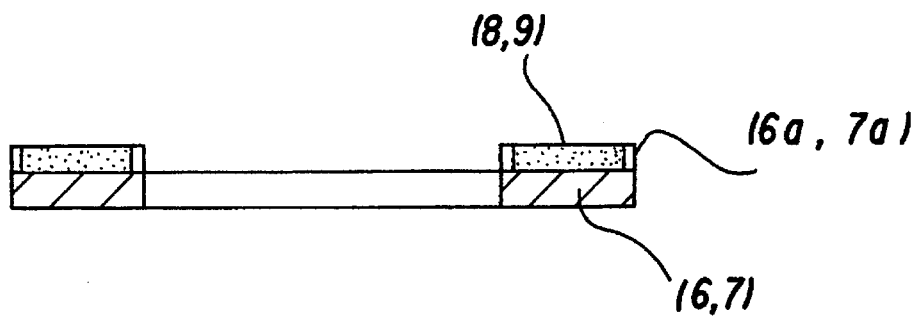
FIG. 3B is a sectional view, taken along line A—A of FIG. 3A, of the state in which permanent magnet pieces are disposed in one ring on a disk.

Referring to FIGS. 3A and 3B, magnet pieces 8 and 9 are attached by an interval which is varied within the diameter of the magnet pieces. The thickness of yokes 6 and 7 supporting magnet pieces 8 and 9 is established so that the density of magnetic flux of the magnet pieces is not saturated. In order not to move magnet pieces 8 and 9, a hole of the same size as that of magnet pieces 8 and 9 is perforated in a non-magnetic material to make magnet piece housings 6a and 7a. These housings are fixed by keys 12 and 13 shown in FIGS. 1 and 2. In FIGS. 3A and 3B, magnet pieces are disposed in one ring in pairs, centering on the starting point of the disk yokes in which a central hole is perforated. N and S poles of the magnet pieces are arranged alternately. Here, the central hollow of disk yokes 6 and 7 is raised by protruding housings 10 and 11, which hold the yokes, of FIGS. 1 and 2, so as to be the same height as that of the magnet pieces.

Figure 4A:
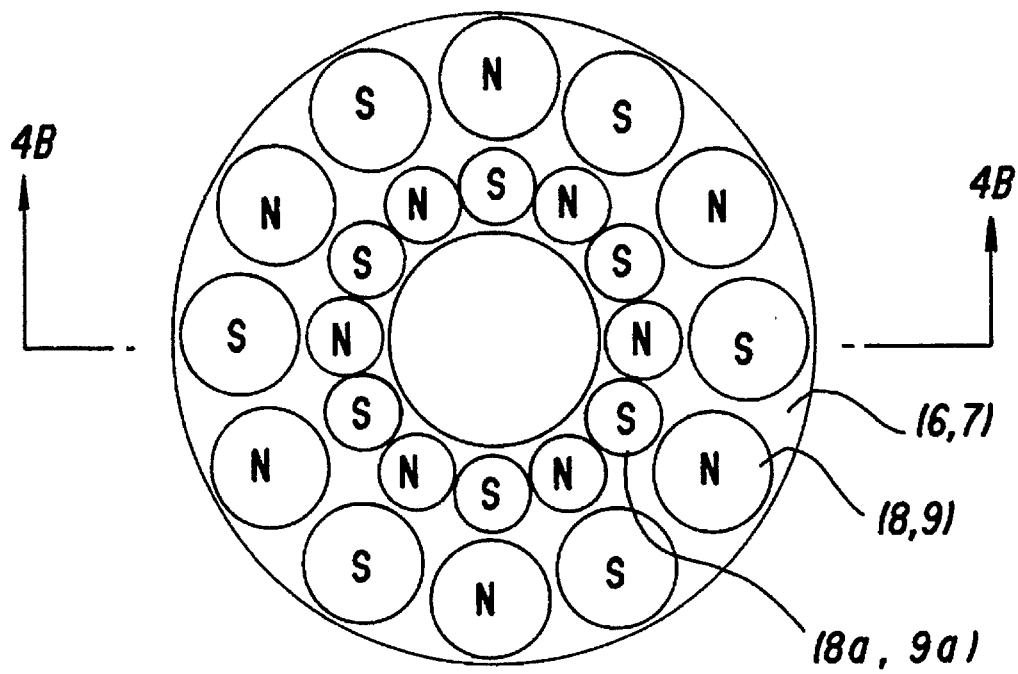
FIG. 4A is a plan view of a state in which permanent magnet pieces are disposed in multiple rings on a disk.
Figure 4B:
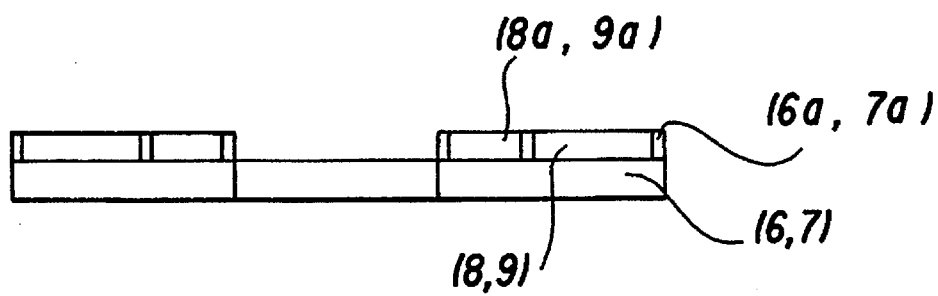
FIG. 4B is a sectional view, cut along line B—B of FIG. 4A, of the state in which permanent magnet pieces are disposed in multiple rings on a disk.

Referring to FIGS. 4A and 4B, the size and array interval of the outer magnet pieces 8 and 9 are the same as those of FIGS. 3A and 3B. The number of smaller magnet pieces 8a and 9a disposed on the inner side is the same as that of the first outer ring. Their poles are opposite to those of the first ring. Here, the size of magnet pieces 8a and 9a disposed on the inner side must be established so that the inner magnet pieces 8a and 9a are inserted within an isosceles triangle formed by connecting both ends of the diameter of outer magnet pieces 8 and 9 to the center point of yokes 6 and 7. This array is the same as the first-ring array. The outer magnet pieces 8 and 9 and inner magnet pieces 8a and 9a adjacent thereto are opposite in polarity. For a multiple-ring array such as 3 and 4 rings, the same way as that of one-ring array and two-ring array can be performed.

Figure 5A:
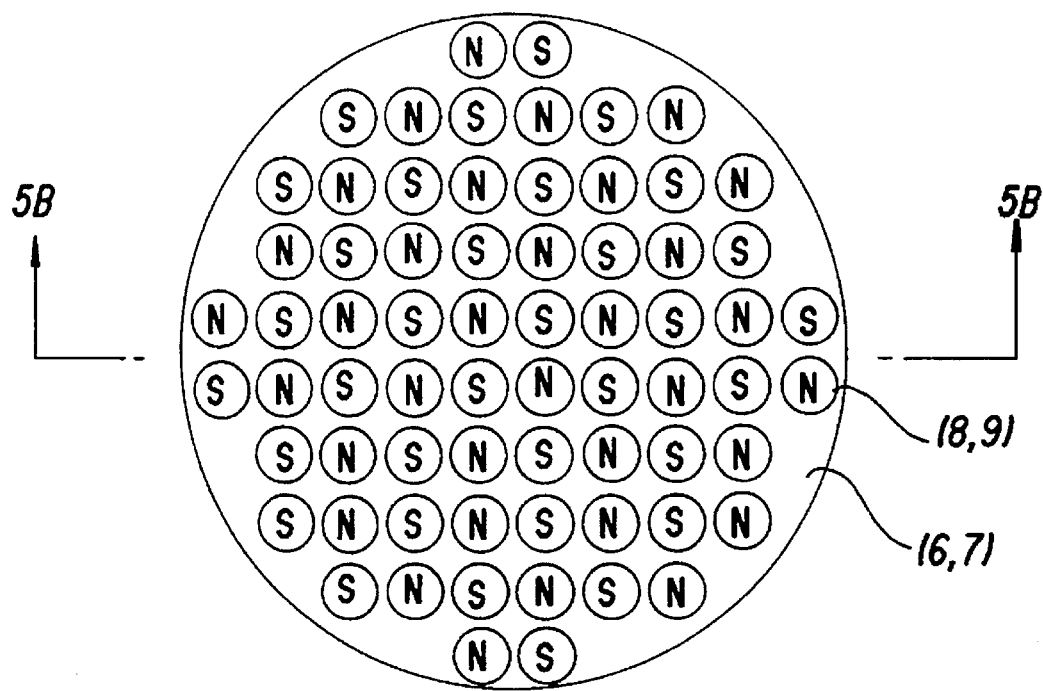
FIG. 5A is a plan view of a state in which permanent magnet pieces are disposed in a rectangle on a disk.
Figure 5B:
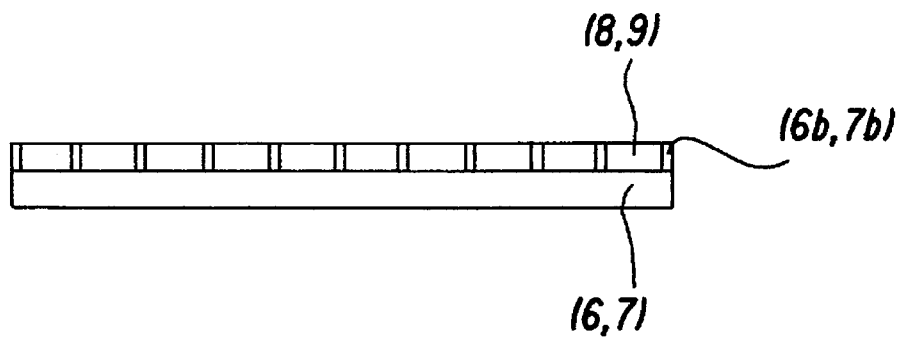
FIG. 5B is a sectional view, cut along line C—C of FIG. 5A, of the state in which permanent magnet pieces are disposed in a rectangle on a disk.

Referring to FIGS. 5A and 5B, magnet pieces are arranged in a rectangle. The size and number of the magnet pieces are predetermined so that they are arranged within the size of disk yokes 6 and 7 whose center is perforated or not in a rectangle or circle. In the array, adjacent magnet pieces are opposite in polarity. Here, the center of four magnet pieces disposed in a rectangle and located around the center of disk yokes 6 and 7 lies exactly at the center thereof. To enhance magnetic force, the magnet pieces excluding the central magnet pieces are increased radially in a row. As the case may be, the rectangular array is performed on yokes in which a hole is perforated. In addition, the radius of the yokes may be increased. Here, similar to the cases of the one-ring array of FIGS. 3A and 3B or the multiple-ring array of FIGS. 4A and 4B, the interval of magnet pieces and the thickness of yokes are set so as not to cause saturation of magnetism. Adjacent magnet pieces are opposite in polarity. The number of magnet pieces is a multiple of 4. They are disposed on the permanent magnet plates of housings 10 and 11 of FIGS. 1 and 2. The upper permanent magnet pieces are disposed to face opposite to the lower permanent magnet pieces in polarity. In other words, two permanent magnet plates are disposed in the same array in the same direction.

In order to increase the attraction of the magnet plates used in the embodiments, the diameter and thickness of the permanent magnet pieces used in one-ring, multiple-ring and rectangular arrays can be controlled. Further, the attraction between two permanent magnet plates depends upon the distance therebetween.

Figure 6:
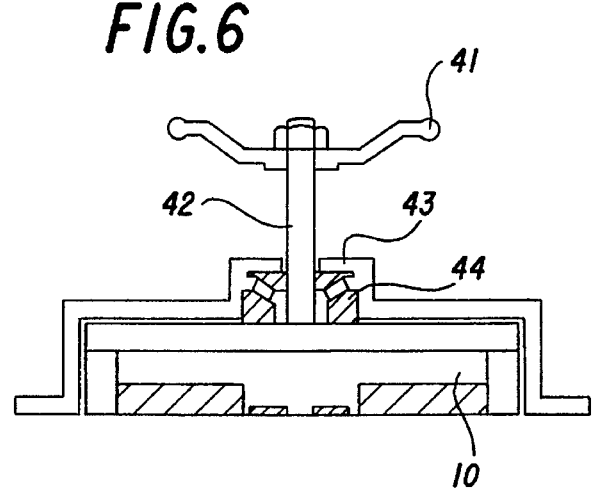
FIG. 6 is a cross-sectional view of still another embodiment of the present invention which can be used for high pressure.

FIG. 6 shows the upper portion of a valve having a magnetic force transmission apparatus used for high pressure according to the present invention.

In order to use the valve for high pressure, the housing placed in the upper rotation portion in which magnet and yokes are incorporated is screw-fastened and then fixed, or just fixed so that the housing resists a high pressure. For dispersion of pressure affecting a upper external cover 43, a taper roller bearing 44 is mounted between upper external cover 43, housing 10 and rotation 42 so that the rotation of the valve becomes smooth. To reinforce the rotation, torque to be generated must be minimized. For this a bearing is used in the rotation part of upper and lower portions. Here, in the upper portion a general bearing is used. In the lower portion chemicals-resistant and non-magnetic bearings are employed. Except this configuration, other structures are the same as in FIGS. 1 and 2.

Of the valves having a magnetic force transmission apparatus, in the glove, gate and needle valves excluding the ball valve, the upper driven portion rotates whereas the stem and the lower driven portion move up and down. This does not allow easy external confirmation of the open/close state of the valve. In order to ascertain the open/close of the valve, the relationship between the degree of the valve's opening/closing when the stem moves up and down, and the rotation number of the handle must be established. When the relation between the rotation and vertical movements are set, there are several ways to confirm the open/close state of the valve as follows.

Figure 7:
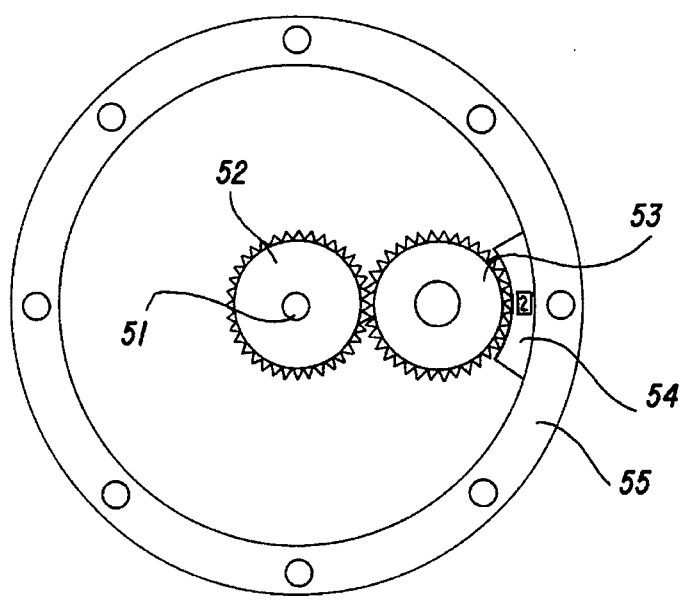
FIGS. 7, 8 and 9 are embodiments of an opening/closing confirming device which is attached to the present invention so as to ascertain whether the valve is opened or closed.
Figure 7:
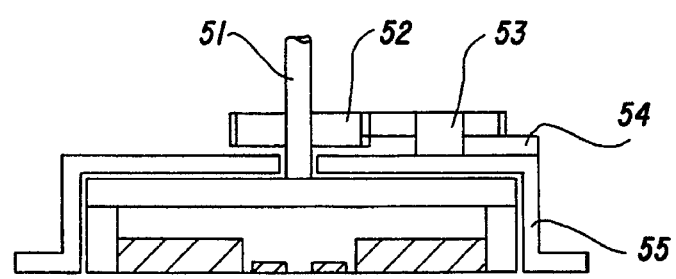

First, as shown in FIG. 7, a gear 53 having a gear ratio of 1:1 is interlocked with a gear 52 installed on the rotation shaft 51 of the handle. On one side of gear 53 an analog counter 54 is provided. According to the rotation number of the handle, a numeral is indicated on analog counter 54 to confirm the open/close state of the valve.

Figure 8:
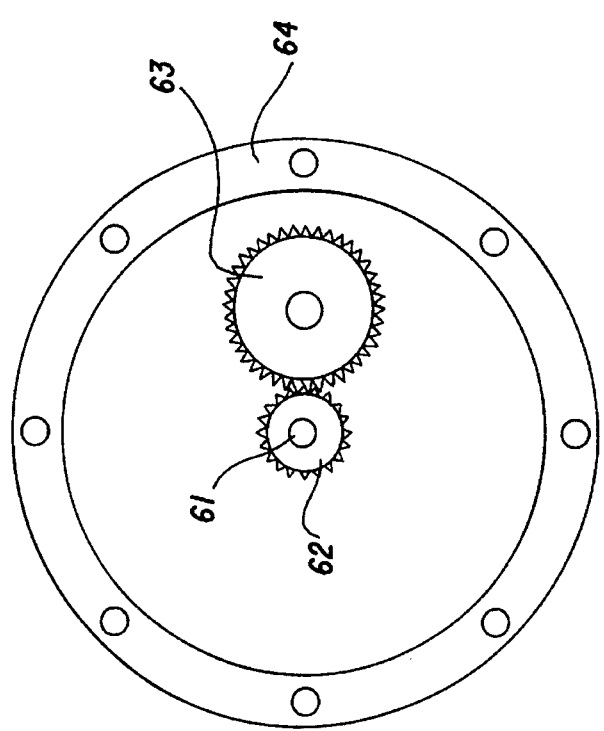
Figure 8:
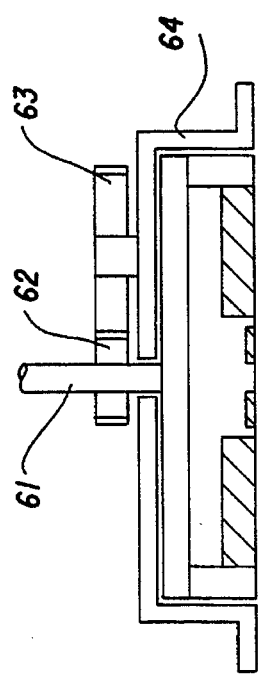

Second, as shown in FIG. 8, the number of rotating from when the valve is closed completely to when the valve is opened completely is confirmed. A state in which the valve is completely closed by the rotation of gear 62 fixed to the rotation shaft 61 of the handle and gear 63 engaged therewith is represented as "0." A state in which the valve is completely opened is represented as "100." This enables the open/close state of the valve to be checked in percentage (%).

Figure 9:
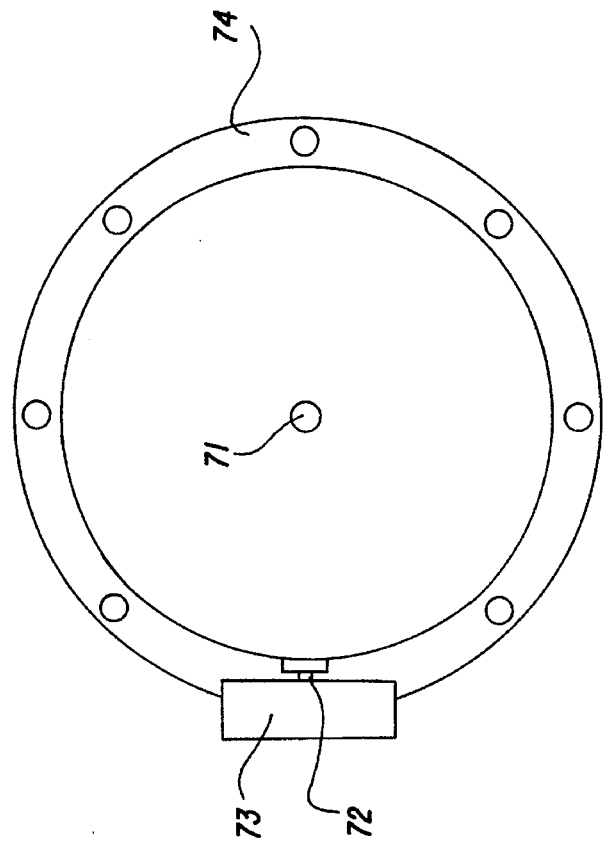
Figure 9:
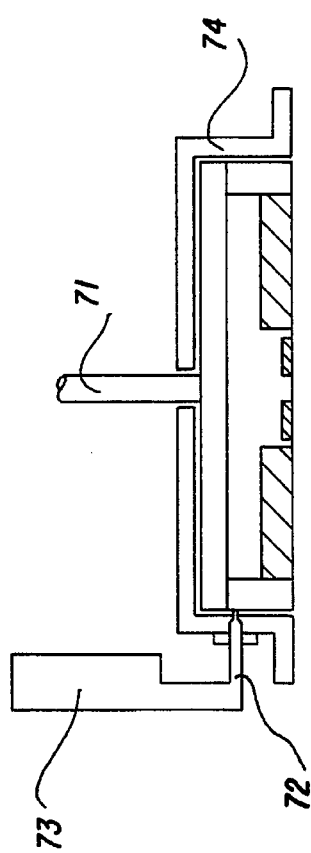

Third, in FIG. 9, a tachometer sensor 72 is mounted to come into contact with the upper rotation portion by perforating one side of external cover 74 of the upper driven portion in which fluid does not flow. Through tachometer 73 the open/close state of the valve is indicated.

As described above, the present invention never uses packings, which are, however, installed in the stem of a conventional valve. Instead, internal components of the valve and the stem all are incorporated in a closed body. Above the closed body a permanent magnet plate in which magnet pieces are attached to a disk iron yoke is installed.

Opposite to the permanent magnet plate located in the upper portion, a permanent magnet plate of the same shape is installed in opposite polarity. As the upper permanent magnet plate is rotated, the opposing lower permanent magnet plate is also rotated by magnetic force. By manipulating the stem of the valve connected to the lower permanent magnet plate, the stem rotates or moves up and down along the axis so that the needle or ball of the valve operates. This opens/closes the flow of fluid.

With the closed body of the array of permanent magnet pieces and stem, fluid is never leaked externally. For this advantage, the present invention is suitable in fields dealing with radioactive substances, which are dangerous for leakage, or poisonous, explosive, or volatile fluids or gases.

Further, the present invention does not require maintenance in preparation for leakage. This is because packings for maintaining the airtightness between driven and fixed portions are not used to thus need no checking or replacement of the component.

What is claimed is:

1. A valve having a magnetic force transmission apparatus, comprising:

a closed body for sealingly enclosing internal components and a rotation shaft of said valve, said internal components, said rotation shaft, and said closed body being configured to interrupt leakage of fluid from said valve and maintain airtightness;

a separation plate separating an internal cavity of said closed body into a first chamber and a second chamber;

a pair of permanent magnet plates opposingly disposed with respect to each other, with a first permanent magnet plate of said pair of permanent magnet plates being disposed in said first chamber, and a second permanent magnet plate of said pair of permanent magnet plates being disposed in said second chamber, said first and second permanent magnet plates being separated by said separation plate, said pair of permanent magnet plates allowing said valve to open/close, each of said pair of permanent magnet plates comprising a yoke and at least one permanent magnet piece, said pair of permanent magnet plates being disposed to provide a magnetic force relative to each other, said pair of permanent magnetic plates transmitting rotating power to each other and to said internal components using the magnetic force thereof, to open/close the valve; and rotation means for imparting rotation to said first magnetic plate, whereby a rotation of said first magnetic plate is transmitted to said second magnetic plate by the magnetic force thereof, thereby opening and closing the valve by movement of the internal components.

2. A valve having a magnetic force transmission apparatus as claimed in claim 1, wherein a diameter and a thickness of said each of said permanent magnet plates is selected to control a force of attraction between said at least one permanent magnet piece of said magnet plates, wherein the force of attraction can be increased or decreased depending upon a selected diameter and a selected thickness of said at least one permanent piece.

3. A valve having a magnetic force transmission apparatus as claimed in claim 1, wherein a plurality of magnet pieces are circularly and planarly arranged in a ring on each said permanent magnet plates, with a predetermined spacing between each magnet piece of said plurality of magnet pieces, and said magnet pieces are disposed with alternating polarity, centering on a starting point at a center of said ring.

4. A valve having a magnetic force transmission apparatus as claimed in claim 3, wherein the interval between said magnet pieces arranged on each said first and second permanent magnet plates is established within the diameter of the arrangement of said magnet pieces, and said magnet pieces are continuously disposed in a multiple-ring array on the inner side of a first ring so that the first ring is an outer ring is opposite to a second, inner ring in polarity.

5. A valve having a magnetic force transmission apparatus as claimed in claim 1, wherein a plurality of magnetic pieces are arranged on each said first and second permanent magnet plates with a predetermined spacing between each magnet piece on each said first and second magnet plates, and a number of the plurality of magnet pieces in a multiple of 4 are disposed in a rectangular array so that adjacent ones of the magnet pieces are opposite in polarity.

6. A valve having a magnetic force transmission apparatus as claimed in claim 1, wherein the internal components include a stem which is elongated downward from said second permanent magnet plate, and a ball which is coupled to said stem, said ball and stem cooperating with said closed body to open/close a flow of fluid.

7. A valve having a magnetic force transmission apparatus as claimed in claim 1, said internal components comprising:

a protruded shaft protruded downward from said second permanent magnet plate said protruded shaft having an inner surface having a female screw thread formed thereupon; and a protruded rod having a male screw thread on an outer surface thereof, said male screw thread engaging said female screw thread, said protruded rod being formed upward from a valve member to move up and down by a rotation of said permanent magnet plates.

8. A valve having a magnetic force transmission apparatus as claimed in claim 1, wherein an external cover is provided over said closed body, said external cover providing protective resistance against pressure on said closed body.

9. A valve having a magnetic force transmission apparatus as claimed in claim 8, wherein a taper roller bearing is mounted to a rotation axis under said external cover, said taper roller bearing for dispersion of pressure affecting said external cover.

10. A valve having a magnetic force transmission apparatus as claimed in claim 8, wherein under said external cover and at said first permanent magnet plates, a first bearing is provided and wherein a second bearing is provided at said second permanent plate, thereby minimizing torque.

11. A valve having a magnetic force transmission apparatus as claimed in claim 1, further comprising an opening/closing confirming device for externally determining whether a valve member in which a stem moves up and down is opened or closed.

12. A valve having a magnetic force transmission apparatus as claimed in claim 11, wherein in said opening/closing confirming device, a first gear having a gear ratio of 1:1 is interlocked with a second gear installed on a shaft of a handle, and on one side of the first gear an analog counter is provided so that according to a rotation number of said handle, a numeral is indicated on said analog counter to confirm if said valve is opened or closed.

13. A valve having a magnetic force transmission apparatus as claimed in claim 11, wherein in said opening/closing confirming device, a state in which said valve is completely closed by a rotation of a first gear fixed to a shaft of a handle and a second gear engaged therewith is represented as "0," and a state in which said valve is completely opened is represented as "100," thereby enabling an open/close state of said valve to be determined in percentage (%).

14. A valve having a magnetic force transmission apparatus as claimed in claim 11, wherein in said opening/closing confirming device, a tachometer sensor is provided to contact an upper rotation portion of said rotation portion through an opening in an external cover of an upper portion of said closed body in which fluid does not flow, thereby indicating if the said valve is opened or closed.

15. A valve as recited in claim 1, wherein said separation plate is electrically conductive and non-magnetic.

16. A valve as recited in claim 1, wherein said rotation means comprises a manually operated handle.

17. A valve as recited in claim 1, wherein said rotation means comprises an automatic actuator.

18. A valve as recited in claim 1, wherein at least one of said first and second permanent magnet plate includes a bearing thereupon, said bearing disposed between said at least one of said first and second permanent magnet plates and said separation plate for reducing friction therebetween.

19. A valve as recited in claim 7, wherein said valve member comprises a gate valve.

20. A valve as recited in claim 11, wherein said valve member comprises a gate valve.

\* \* \* \* \*